United States Patent
Feliss et al.

(10) Patent No.: US 7,364,307 B2
(45) Date of Patent: Apr. 29, 2008

(54) METHOD AND SYSTEM FOR A BEAM PROJECTOR HAVING DATA MANIPULATION CAPABILITIES

(75) Inventors: Norbert A. Feliss, Sunnyvale, CA (US); Donald R. Gillis, San Jose, CA (US); Mike Suk, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 334 days.

(21) Appl. No.: 10/931,532

(22) Filed: Aug. 31, 2004

(65) Prior Publication Data

US 2006/0044517 A1   Mar. 2, 2006

(51) Int. Cl.
G03B 21/00 (2006.01)
G03B 21/18 (2006.01)

(52) U.S. Cl. .................. 353/54; 353/121; 353/122

(58) Field of Classification Search ............. 353/52, 353/54, 57, 60, 25, 121–122
See application file for complete search history.

(56) References Cited

U.S. PATENT DOCUMENTS

| | | | |
|---|---|---|---|
| 4,549,796 A | 10/1985 | Hurvitz | |
| 5,136,397 A | 8/1992 | Miyashita | |
| 5,680,233 A * | 10/1997 | Faris et al. | 349/61 |
| 6,588,907 B1 * | 7/2003 | Billington et al. | 353/57 |
| 6,626,543 B2 * | 9/2003 | Derryberry | 353/119 |
| 6,712,476 B1 * | 3/2004 | Ito et al. | 353/122 |
| 6,808,268 B2 * | 10/2004 | Vrachan et al. | 353/10 |
| 6,860,609 B2 * | 3/2005 | Olson et al. | 353/122 |
| 6,991,335 B2 * | 1/2006 | Kondo et al. | 353/54 |
| 7,018,043 B2 * | 3/2006 | Castaldi et al. | 353/30 |
| 7,064,956 B2 * | 6/2006 | Patel | 361/697 |
| 2002/0191159 A1 | 12/2002 | Nagao et al. | |

* cited by examiner

Primary Examiner—Christopher Mahoney
(74) Attorney, Agent, or Firm—Duke Amaniampong (57) ABSTRACT

A method and system for a beam projector having data manipulation capabilities. The beam projector includes a central processing unit integral with the beam projector, a memory portion coupled with the central processing unit and a signal-receiving portion coupled with the central processing unit. The signal-receiving portion for receiving data and providing the data to the central processing unit such that the central processing unit of the beam projector organizes the data into a viewable presentation without requiring input from a secondary computing device.

18 Claims, 9 Drawing Sheets

METHOD AND SYSTEM FOR A BEAM PROJECTOR HAVING DATA MANIPULATION CAPABILITIES

TECHNICAL FIELD

The present invention relates to the field of beam projectors, and more particularly to a method and system for a beam projector having data manipulation capabilities.

BACKGROUND ART

Beam projectors are used in media presentation environments such as business meetings, home theaters and the like. In general, the beam projector has taken the place of overhead projectors, slide projectors, and other devices used for showing visual presentations. For example, it is common in a meeting to connect a laptop or other computing system to a beam projector and then project a media presentation that everyone in the room can observe (e.g., slideshow, video, real-time data, or the like). In most multimedia type rooms, the beam projector is mounted on the ceiling and hardwired to an outlet on the wall and a user connects their laptop with the hardwiring to utilize the beam projector.

However, multimedia rooms are cost prohibitive. Therefore, an office building may have a few multimedia rooms but generally not all the meeting rooms will be multimedia rooms. Additionally, in the non-multimedia rooms, it may also be necessary to view a visual presentation. Therefore, a presenter may carry a portable beam projector to ensure that they will be able to show the visual presentation even if they do not have access to a multimedia room.

Portable beam projectors also provide the ability for a presenter to hold a meeting in a location other than the multimedia room or even the office building. For example, the presentation may be shown at the back room of a coffee shop, a restaurant, or any location that has a power outlet.

However, one drawback of a portable beam projector is the cooling time after the beam projector is turned off. For example, a standard beam projector requires a long time delay (many minutes) of fan operation after shutdown to allow bulb and optics cooling. For a mounted beam projector hardwired to the building power, this may not be a concern. However, for a portable beam projector, it means that the presenter must wait a long time delay (many minutes) after the visual presentation ends before he can unplug and pack-up the portable beam projector.

Beam projectors, both mounted and portable, also require an amount of cooling during their operation. Specifically, the light-generating source of the beam projector gets extremely hot and requires a fan to provide the cooling to maintain the life of the bulb. However, when the fan is operational, noise from the fan is loud enough to interfere with conversations. This problem is even more pronounced when teleconferencing or video-conferencing is used during the presentation. In that case, the fan may provide negative feedback to the conferencing microphone causing disrupted reception for the off-site personnel.

In addition to the cooling issues discussed herein, beam projectors both mounted and portable also contain drawbacks with respect to sharing, multiple presenters, and the like. For example, during a presentation the beam projector is a "dumb" device. That is, it functions as a monitor. In order to use the projector it must be connected to a computing system. Therefore, not only must a presenter ensure that a beam projector (e.g., mounted or portable) is present, the presenter must also ensure that a computing system is available for connection with the beam projector. In some cases, e.g., multimedia rooms, the beam projector may be connected with a desktop computer. In other cases, the user will have to hook a portable computer up to the beam projector.

With respect to the mounted beam projector and its associated desktop computer, a presenter may not want to (for security reasons) load his presentation onto the machine or the user may not be allowed to load his presentation onto the desktop computer thereby rendering the beam projector unusable. On the other hand, when connecting a portable computer with the beam projector, it is tedious during a presentation to change the connection between laptops for each speaker's own portable computer. In addition, it is not uncommon for missing or incorrect drivers to cause non-operation or delays in the presentation process.

To save time, in some cases, all the presentations may be loaded onto a single user's portable computer prior to a multi-person presentation. However, in a competitive environment, it is not always acceptable to competitors to allow their presentation information to a stored on a competitor's computer.

SUMMARY

A method and system for a beam projector having data manipulation capabilities. The beam projector includes a central processing unit integral with the beam projector, a memory portion coupled with the central processing unit and a signal-receiving portion coupled with the central processing unit. The signal-receiving portion for receiving data and providing the data to the central processing unit such that the central processing unit of the beam projector organizes the data into a viewable presentation without requiring input from a secondary computing device.

BEST MODES FOR CARRYING OUT THE INVENTION

Reference will now be made in detail to the alternative embodiment(s)s of the present invention, a system and method for cooling a beam projector. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
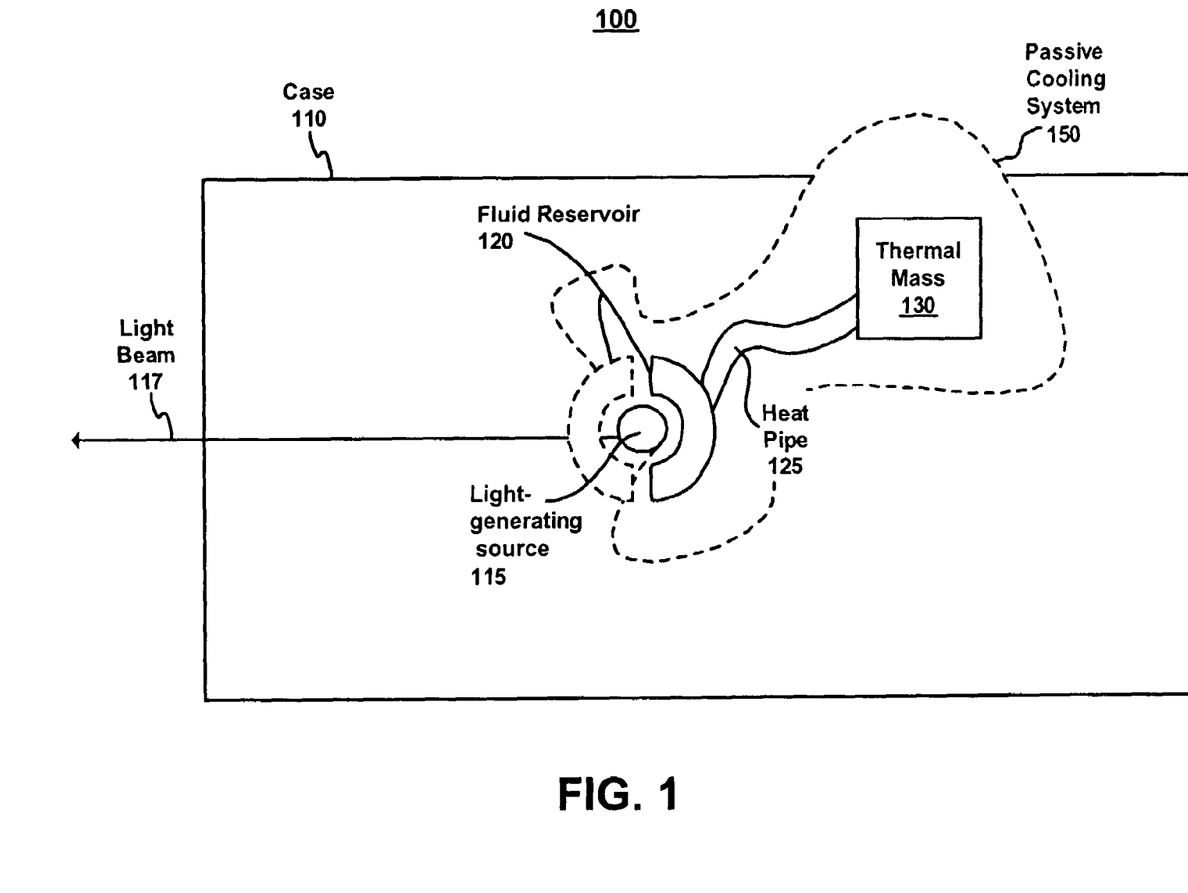
FIG. 1 is a block diagram of a system for passively cooling a beam projector in accordance with one embodiment of the present invention.

With reference now to FIG. 1, a block diagram of a system for passively cooling a beam projector 100 in accordance with one embodiment of the present invention is shown. The following discussion will begin with a detailed description of the physical structure of the passive cooling beam projector assembly. The discussion will then contain a detailed description of the operation of the active and passive cooling of the present beam projector assembly. Regarding the physical structure of the present beam projector assembly, for purposes of clarity, only a top view of the beam projector assembly 100 is shown in FIG. 1. In the present embodiment beam projector assembly 100 includes a beam projector case 110 providing both protection and mounting locations for the various internal beam projector components.

Referring still to FIG. 1, beam projector assembly 100 also includes a light-generating source 115 which projects the beam of light 117 from the beam projector assembly 100. In one embodiment, light-generating source 115 is the portion of the beam projector assembly 100 that generates the most heat and is also the most susceptible to overheating or temperature spikes. Importantly, as will be discussed in detail below, in one embodiment, light-generating source 115 requires a fair amount of cooling during and after utilization of the beam projector assembly 100.

Beam projector assembly 100 also includes a passive cooling system 150. In one embodiment, passive cooling system 150 includes a fluid reservoir 120, a heat pipe 125 and a thermal mass 130. In one embodiment, fluid reservoir 120 is proximal to the light-generating source 115. In FIG. 1, the fluid reservoir 120 is disposed partially surrounding light-generating source 115. However, in another embodiment, the fluid reservoir 120 completely surrounds the light-generating source 115. As will be described in detail herein, fluid reservoir 120 is a portion of passive cooling system 150 utilized for providing the initial heat dissipation from the light-generating source 115. Heat pipe 125 is formed from a thermal material capable of transferring the higher energy state fluid from the fluid reservoir 120 to the thermal mass 130. Thermal mass 130 is a heat sink type device set apart from heat susceptible components and capable of dissipating heat transferred from the light-generating source 115.

The heat from the light-generating source 115 is established with a low energy state fluid (e.g., a liquid) in the fluid reservoir 120 resulting in a portion of the low energy state fluid in the fluid reservoir 120 to change into a higher energy state fluid (e.g., a gas or vaporizing fluid). The higher energy state fluid is then carried along the heat pipe 125 which is coupled with the fluid reservoir 120. When the higher energy state fluid reaches the end of heat pipe 125, the higher energy state fluid returns to the low energy state by releasing the heat energy to the thermal mass 130. In so doing, the thermal mass 130 receives the heat generated by light-generating source 115 and utilizes standard heat sink methods (e.g., conduction and radiation of the heat over the surface area of the thermal mass 130) to dissipate the heat received from the higher energy state fluid.

In beam projector assemblies not having a passive cooling system 150, the post utilization cooling time may require many minutes of additional cooling prior to unplugging the beam projector assembly 100 (referred to herein as pack time). However, as will be described in detail herein, the utilization of embodiments of the present passive cooling system 150 reduces the pack time of the beam projector assembly 100 to less than a minute. Although such times are provided here, embodiments of the invention may provide results that are more or less than the times stated herein. However, in each embodiment, the pack time is reduced when the passive cooling system 150 is utilized.

Figure 2:
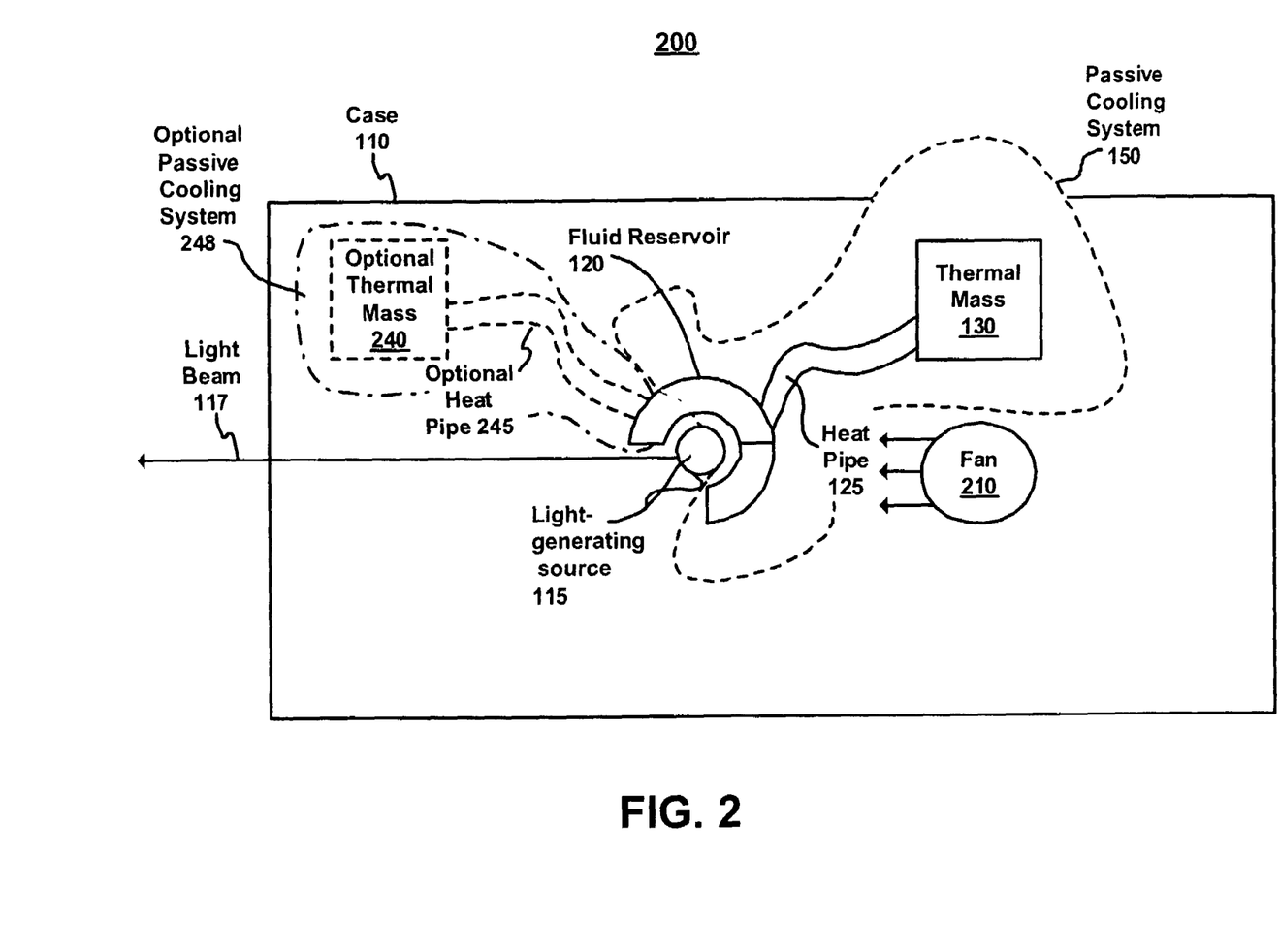
FIG. 2 is a block diagram of a system for actively and passively cooling a beam projector in accordance with one embodiment of the present invention.

FIG. 2 illustrates another embodiment for cooling a beam projector in which the beam projector assembly 200 is actively and passively cooled. That is, FIG. 2 incorporates an active cooling system (e.g., fan 210) to provide additional airflow over the light-generating source 115. In addition, beam projector assembly 200 includes optional additional heat pipe 245 and optional additional thermal mass 240 for providing further heat dissipation for the light-generating source 115. For purposes of brevity and clarity each of the numerous possibilities of optional passive cooling systems 150 are not shown in the present Figures. It is also appreciated that FIG. 1 may contain the optional additional heat pipe 245 and thermal mass 240.

Figure 3:
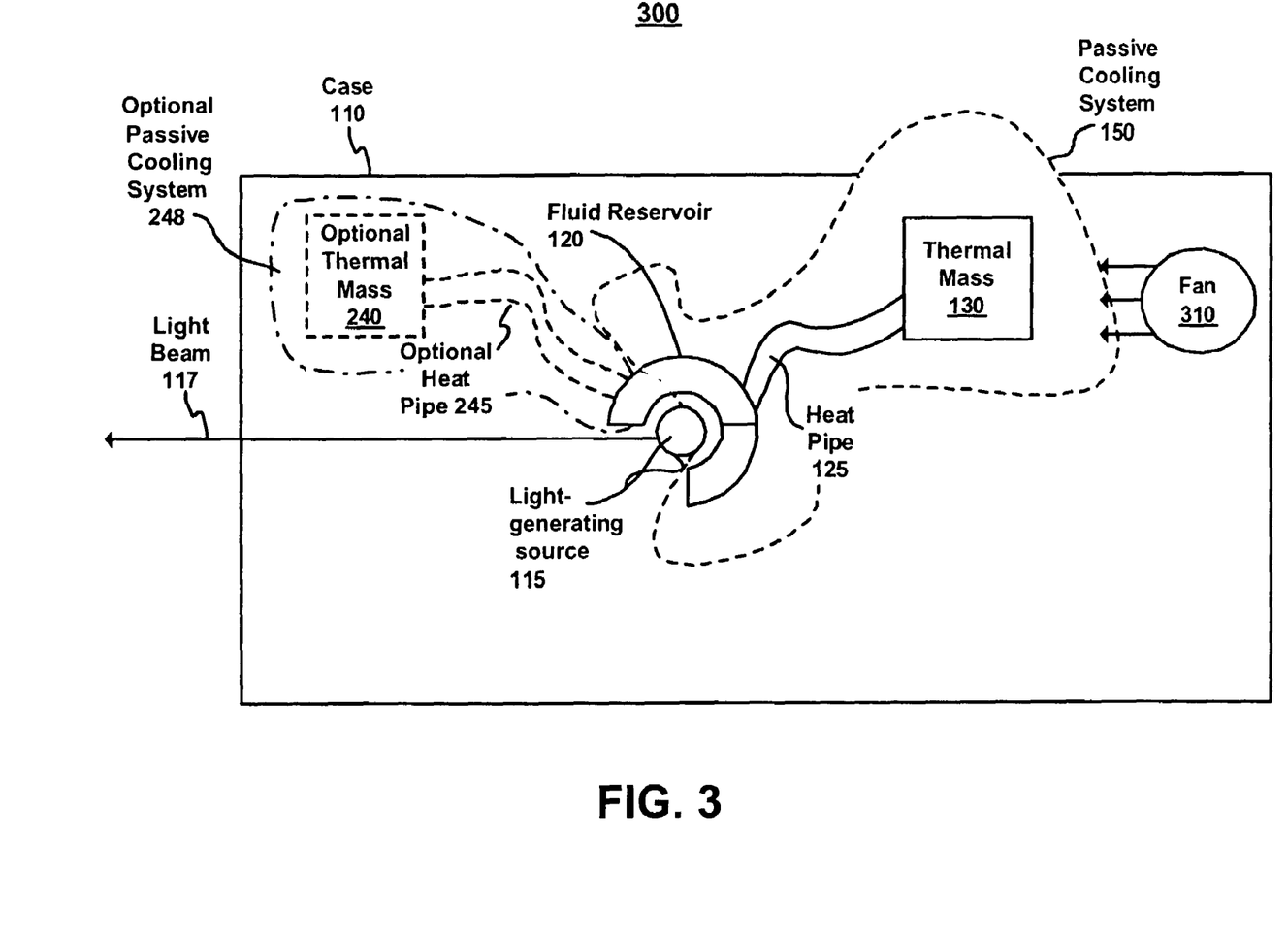
FIG. 3 is a block diagram of a system for actively and passively cooling a beam projector in accordance with another embodiment of the present invention.

With reference now to FIG. 3, in one embodiment beam projector assembly 300 also includes active and passive cooling systems. However, instead of incorporating an active cooling system for providing increased airflow around the light-generating source 115, active cooling system fan 310 is used to provide increased airflow across the thermal mass 130 and/or optional thermal mass 140. In one embodiment, active cooling system fan 310 is a low speed fan providing airflow at a lower rate than that of fan 210 due to the increased surface area of the thermal mass 310. Therefore, the noise generated by active cooling system fan 310 is reduced in comparison with fan 210.

Figure 4:
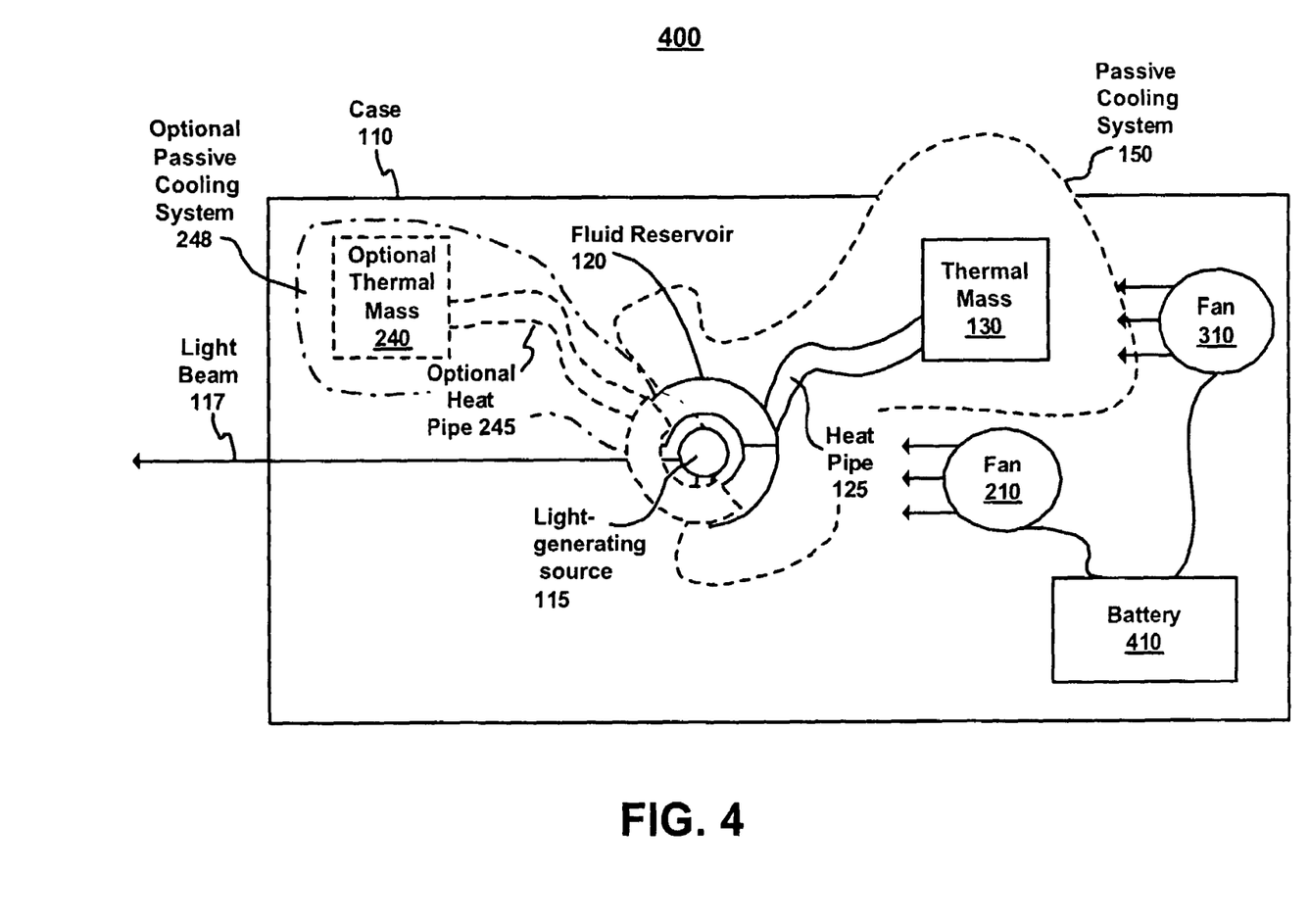
FIG. 4 is a block diagram of a system for actively and passively cooling a beam projector utilizing battery power in accordance with one embodiment of the present invention.

With reference now to FIG. 4, in one embodiment, beam projector assembly 400 includes both active cooling systems described herein. That is, beam projector assembly 400 includes a fan 210 for providing increased airflow around light-generating source 115 and also active cooling system fan 310 for providing increased airflow over thermal mass 130 (and/or optional thermal mass 240). In addition, beam projector assembly 400 includes battery 410. In one embodiment, battery 410 is a battery that recharges when the beam projector assembly 400 is plugged into a power source (e.g., alternating current (AC) from a wall outlet) and runs any or all of the active cooling system fans (e.g., 210 and/or 310) when the beam projector assembly 400 is unplugged from the power source. In one embodiment, the battery 410 may operate the fan/s whenever the beam projector assembly 400 is initially unplugged. In another embodiment, the battery 410 includes a thermal switch that activates the discharge of the battery 410 when the light-generating source 115 requires additional cooling. Although specific embodiments are shown in FIG. 1-4, it is understood that the embodiments of the invention are well suited to various combinations of fans, heat pipes, thermal masses, and the like. More importantly, the present invention provides a method and system for cooling a beam projector with a plurality of possible embodiments and combinations of embodiments. Those embodiments described herein are for purposes of clarity.

Use and Operation

The following is a detailed description of the use and operation of the present system and method for cooling a beam projector. With reference again to FIG. 1, in one embodiment of the present invention, a passive cooling method and system for a beam projector assembly 100 is shown. Specifically, the passive cooling system 150 is utilized to help dissipate the heat generated by the light-generating source 115 both during operation of the beam projector assembly 100 and after use of the beam projector assembly 100 until the light-generating source 115 is sufficiently cooled.

In general, sufficiently cooled refers to the temperature at which the light-generating source 115 will not be damaged if the cooling systems were to stop operation. The method used for cooling light-generating source 115 to a sufficient temperature may be controlled by the type of fluid utilized in passive cooling system 150. For example, as is well known in the art, the volatility of a fluid provides a direct relationship between the vapor point of the fluid and the temperature of the light-generating source 115.

In operation, the beam projector assembly 100 is connected to a power source, for example, plugged into a wall outlet. The light-generating source 115 generates a beam of light 117 which is the "projection" seen by those watching the presentation. While the light-generating source 115 is operational, heat is also generated as a by-product and the heat generated by the light-generating source 115 must be dissipated or the light-generating source 115 will fail. Moreover, damage to the light-generating source 115 even to include the reduction of life span of the light-generating source 115 is not desirable due to the prohibitive cost associated with buying a replacement light-generating source 115.

In order to dissipate the heat, a passive cooling system 150 is used to remove the heat from the light-generating source 115. In general, the fluid reservoir 120 is filled with a fluid in a low energy state (e.g., a liquid) having a vapor point that is within the tolerances of the operating temperature of light-generating source 115. Therefore, when light-generating source 115 reaches the vapor point temperature, the low energy state fluid in the fluid reservoir 120 begins to change to a higher energy state fluid (e.g., a gas) thereby transferring, via the heat energy of vaporization, heat emitted from the light-generating source 115. As is well known in thermodynamics, as long as a portion of the fluid in the fluid reservoir 120 remains in the low energy state (e.g., liquid form), the temperature of the fluid reservoir will remain at or below the vapor point temperature of the fluid.

The higher energy state fluid generated in the fluid reservoir 120 then traverses along the heat pipe 125 toward the thermal mass 130. The heat energy contained in the higher energy state fluid is then released to the thermal mass 130 when the higher energy state fluid (e.g., gas) returns to a lower energy state fluid (e.g., liquid) state. In so doing, the heat generated by the light-generating source 115 is transferred from the light-generating source 115 to the thermal mass 130. In one embodiment, the heat pipe 125 is made from any number of materials known in the art to provide a path for the higher energy state fluid to reach the thermal mass 130. In one embodiment, thermal mass 130 is a heat sink. Additionally, in one embodiment thermal mass 130 contains ducting, fins, or the like to increase the surface area of thermal mass 130. In addition, thermal mass 130 and/or heat pipe 125 may be formed from a thermally conductive metal such as aluminum, copper, gold, or the like.

Therefore, by utilizing the passive cooling system 150, the beam projector assembly 100 may be operated without a cooling fan and the associated fan noises. In addition, since the cooling system 150 is passive, there is no need to wait for the beam projector assembly 100 to cool prior to pack up. Therefore, pack time is reduced since there is no need to keep the beam projector assembly 100 plugged in after the presentation is complete.

With reference now to FIG. 2, in one embodiment, a cooling fan 210 is added to the beam projector assembly 200 and an additional optional passive cooling system 248 is shown. With respect to the additional optional passive cooling system 248, it is appreciated that it may also be added to FIG. 1. That is, there may be any number of passive cooling systems of FIG. 1. The use of only one passive cooling system 150 of FIG. 1 is merely for clarity.

Cooling fan 210 is used to provide additional airflow to the light-generating source 115. In one embodiment, the cooling fan 210 has a thermal switch that turns on the cooling fan 210 if the temperature of the light-generating source 115 reaches a certain temperature. Therefore, the cooling fan 210 may be intermittent. That is, the cooling fan 210 will remain inactive until the thermal switch is tripped at which point the cooling fan 210 will activate. Then, when the temperature of the light-generating source 115 is lowered, the thermal switch will trip again and the cooling fan 210 will be deactivated. In so doing, even though the active cooling system (e.g., fan 210) is used, the overall noise of the beam projector assembly 200 is reduced since fan 210 is of low speed or intermittent type. Moreover, the cooling fan 210 may act as a backup system to ensure that a problem with the passive cooling system 150 (or optional cooling system 248) does not result in a loss of light-generating source 115. In another embodiment, a plurality of cooling fans 210 is present.

With reference now to FIG. 3, in one embodiment, a cooling fan 310 is added to the beam projector assembly 300, and the additional optional passive cooling system 248 is also shown. With respect to the additional optional passive cooling system 248, it is appreciated that it may be added to any of the Figures. That is, there may be any number of passive cooling systems for FIG. 1, 2, 3, or 4. The use of only one passive cooling system 150 in FIG. 1 is merely for clarity.

Cooling fan 310 of FIG. 3 is used to provide additional airflow to the thermal masses (e.g., 130 and/or 240). In one embodiment, the cooling fan 310 has a thermal switch that turns on the cooling fan 310 if the temperature of the thermal masses (e.g., 130 and/or 240) reaches a certain temperature. Therefore, the cooling fan 310 may be intermittent. That is, the cooling fan 310 will remain inactive until the thermal switch is tripped at which point the cooling fan 310 will activate. Then, when the temperatures of the thermal masses (e.g., 130 and/or 240) are lowered, the thermal switch will trip again and the cooling fan 310 will be deactivated. Therefore, even though the active cooling system (e.g., fan 310) is used, the overall noise of the beam projector assembly 300 is reduced since the cooling fan 310 is either intermittent or reduced speed. Moreover, in one embodiment the cooling fan 310 is operated at a lower speed. That is, since the thermal masses (e.g., 130 and/or 240) are larger surface area they dissipate heat more easily and therefore only require a slower airflow. Thus, although a fan 310 may be operational, it will not be as loud as fan 210 of FIG. 2, since fan 310 is running at a lower speed. In another embodiment, a plurality of cooling fans 310 is present.

With reference now to FIG. 4, a beam projector assembly 400 having a battery 410 is shown in accordance with one embodiment of the present invention. In addition, beam projector assembly 400 shows both cooling fans 210 and 310. However, it is appreciated that the battery 410 may be utilized in a beam projector assembly 400 having only one of the cooling fans (e.g., 210 or 310), or having a plurality of cooling fans 210 and/or a plurality of cooling fans 310. In general, battery 410 is utilized to provide a source of power to the cooling fans 210 and/or 310 when the primary power source (e.g., the wall outlet) is disconnected. For example, after operation, the beam projector assembly 400 is unplugged and packed away. During the packing away process, and afterward if necessary, the battery 410 will power the fans 210 and/or 310 to ensure that the light-generating source 115 and/or thermal mass 130 is sufficiently cooled.

Therefore, after a user completes a presentation, the user may simply pack-up the beam projector 400 without keeping the unit plugged in to the primary power source to power the cooling fans 210 and/or 310. In so doing, a user's pack time is more efficiently utilized and the light-generating source 115 is not damaged by early removal from the primary power source. In another embodiment, the battery 410 will provide sufficient power to operate the fans 210 and/or 310 until the light-generating source 115 is sufficiently cooled in the case of a power loss during operation. Thus, the passive cooling system 150 and battery 410 are also valuable components of a mounted beam projector assembly as well as a portable beam projector assembly.

Figure 5:
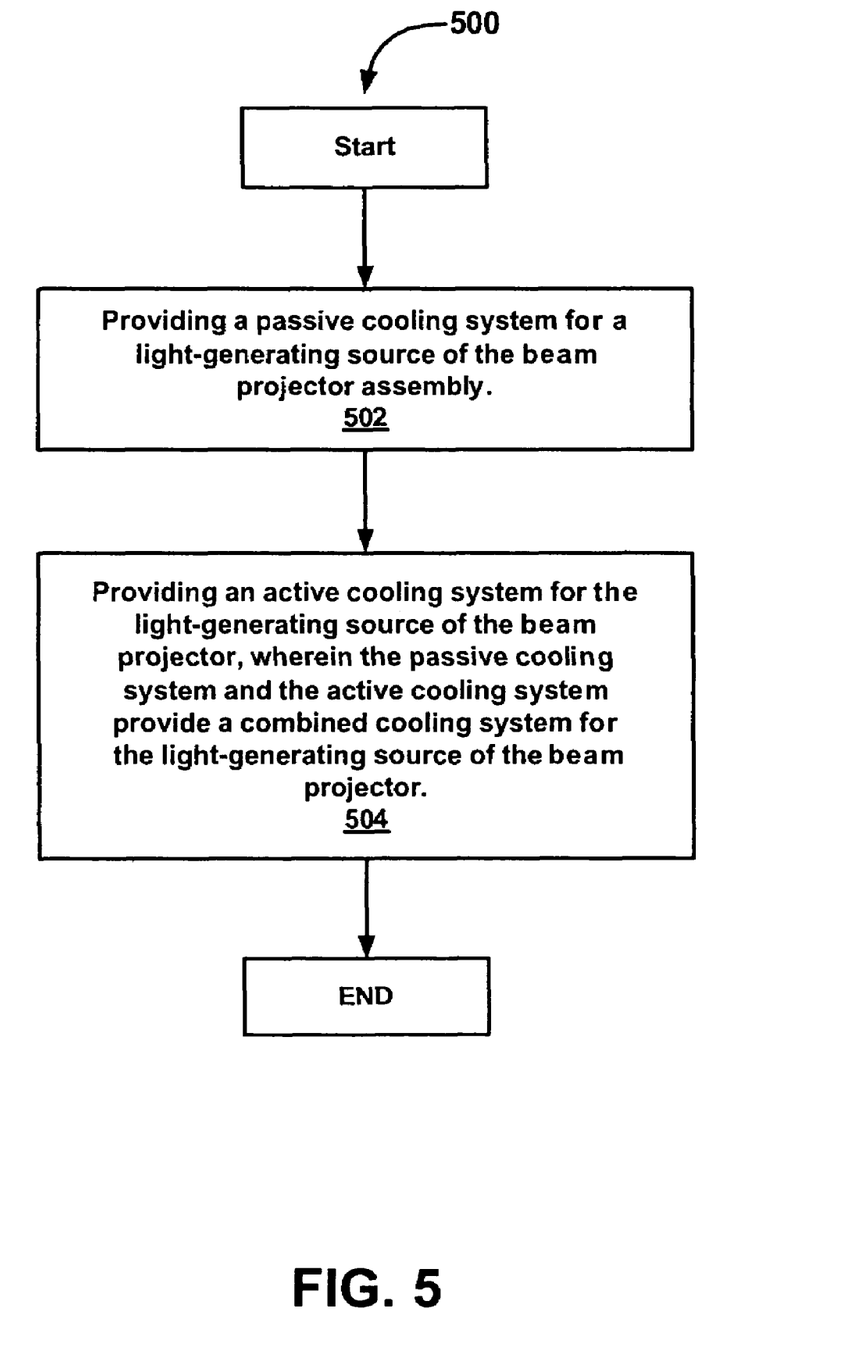
FIG. 5 is a flowchart of a method for actively and passively cooling a beam projector in accordance with one embodiment of the present invention.

With reference now to FIG. 5, a flowchart of a method for actively and passively cooling a beam projector is shown in accordance with one embodiment of the present invention. It is appreciated that the embodiments are well suited to both portable beam projector assemblies and mounted beam projector assemblies.

With reference still to FIG. 5, in one embodiment step 502 provides a passive cooling system 150 for a light-generating source 115 of the beam projector assembly 400 of FIG. 4. In one embodiment, the passive cooling system 150 includes a fluid reservoir 120 proximal to the light-generating source 115. In addition, the passive cooling system 150 includes a heat pipe 125 coupled with the fluid reservoir 125. Furthermore, the passive cooling system 150 includes a thermal mass 130 coupled with the heat pipe 125. In general, the thermal mass 130 is used for dissipating a heat energy transferred from the light-generating source 115 via the fluid in the fluid reservoir 120.

For example, as described in detail herein, the fluid reservoir 120 is proximal to the light-generating source 115 of the beam projector 400, a heat pipe 125 is connected with the fluid reservoir 120 and a thermal mass 130 is connected with the heat pipe 125. The fluid reservoir 120 stores a low energy state fluid (e.g., a liquid) that changes to a higher energy state fluid (e.g., a gas) when the fluid absorbs heat energy generated by the light-generating source 115. The heat pipe 125 then transmits the higher energy state fluid. The thermal mass 130 receives and dissipates the heat energy which is released from the higher energy state fluid when it returns to a low energy state in the proximity of the thermal mass 130.

In another embodiment, a second optional passive cooling system 248 includes a heat pipe 245 coupled with the fluid reservoir 120 and a thermal mass 240 coupled with the heat pipe 245. Thereby providing a plurality of both thermal masses and heat pipes. Furthermore, a low speed fan 310 may be utilized in conjunction with the passive cooling system 150 and/or 248 thereby providing increased airflow to the thermal mass 130 (and/or optional thermal mass 240) coupled with the heat pipe 125 (and/or optional heat pipe 245).

Referring still to FIG. 5, in one embodiment step 504 provides an active cooling system (e.g., fan 210 and/or 310) for the light-generating source 115 of the beam projector 400 of FIG. 4, wherein the passive cooling system 150 and the active cooling system (e.g., fan 210 and/or fan 310) provide a combined cooling system for the light-generating source 115 of the beam projector 400. In one embodiment, the active cooling system includes a thermal mass (e.g., a heat sink such as fluid reservoir 120, light-generating source 115, or a separate heat sink coupled therewith) proximal to the light-generating source 115 and a fan 210 for providing airflow across the thermal mass. In another embodiment, the active cooling system includes fan 310 for providing increased airflow across the thermal mass 310 and any additional thermal masses (e.g., thermal mass 240) of the passive cooling system 150.

In one embodiment, a battery 410 is provided for powering the active cooling system when the beam projector assembly 400 is unplugged from a primary power source. The battery 410 may be used to power the cooling fan 210, cooling fan 310, or both cooling fan 210 and cooling fan 310. In addition, in order to maintain a charged battery 410, in one embodiment, battery 410 is recharged when the beam projector assembly 400 is plugged into a primary power source (e.g., an AC outlet).

Data Manipulation Capabilities

Figure 6:
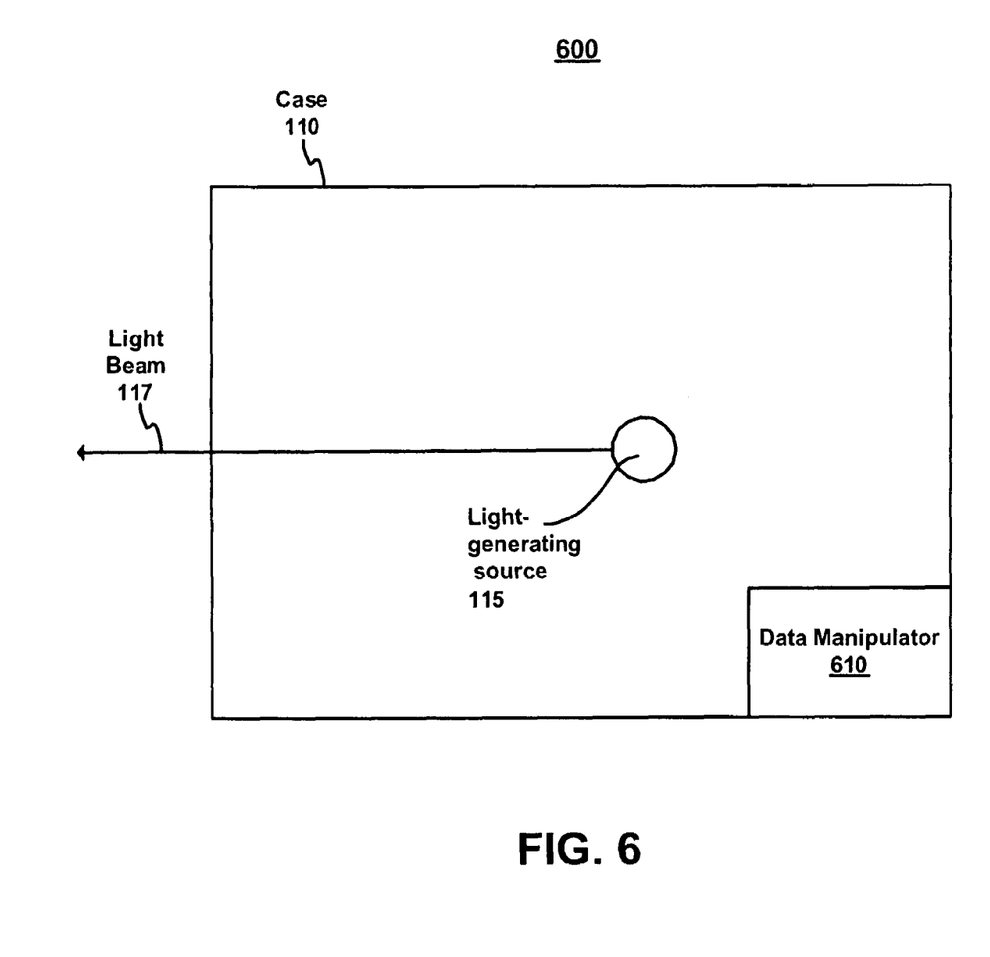
FIG. 6 is a block diagram of a beam projector having data manipulation capabilities in accordance with one embodiment of the present invention.

With reference now to FIG. 6, a block diagram of a beam projector assembly 600 having data manipulation capabilities is shown in accordance with one embodiment of the present invention. In one embodiment, the beam projector assembly 600 includes a data manipulator 610. In general, data manipulator 610 operates similar to a computing system within the beam projector assembly 600. In other words, the data manipulator is capable storing and running an application, of receiving data that is formatted for the application, and providing the output of the application (e.g., the slideshow, presentation, video, music, audio, or the like) via light-generating source 115. Therefore, in one embodiment, the beam projector assembly 600 is not required to have a computing system (e.g., a laptop, desktop, palm pilot, or the like) coupled therewith. That is, instead of needing a separate computing system to operate the beam projector and the beam projector simply acting as a monitor or display for the separate computing system, the beam projector 600 of the present embodiment, instead provides the functionality of the beam projector 600 in addition to the capabilities of data manipulation.

For example, beam projector 600 can receive input data from a stored format (e.g., zip disk, flash media, wireless input, memory stick, or the like) and provide a processor having the proper applications to open the stored information and present the information via the beam projector 600. In one embodiment, since the data is input from a stored format, the data is not stored in the data manipulator 610. Instead, the data is accessed by an application on the data manipulator 610 and presented as a read only presentation.

Therefore, a plurality of presentations (e.g., sets of input data) may be presented by the beam projector 610 and none of the data from the input data (e.g., the flash media, etc.) will be stored by or on the beam projector 600. In another embodiment, the data manipulator 610 will be configured to store the input data if the option to store the data is selected.

Therefore, in one embodiment, instead of having a separate computing system connected with the beam projector 600, the beam projector 600 can receive the information from a storage device and operate without maintaining a connection with a separate computing system. That is, the beam projector 600 and specifically data manipulator 610 can manipulate the stored data to sufficiently provide a presentation.

Figure 7:
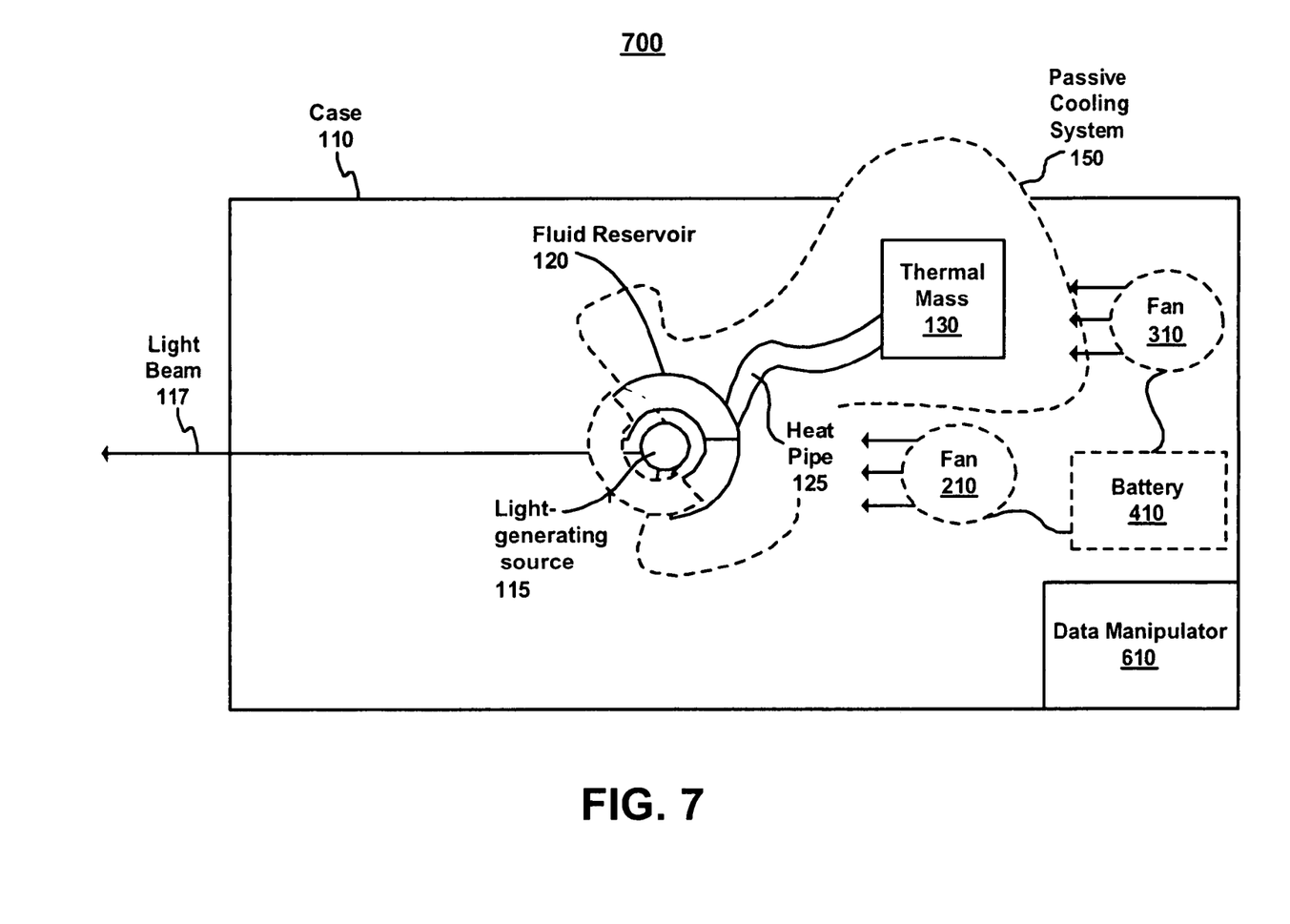
FIG. 7 is a block diagram of a beam projector having data manipulation capabilities and additional cooling system components in accordance with one embodiment of the present invention.

Referring now to FIG. 7, a block diagram of a beam projector having data manipulation capabilities and additional cooling system components is shown in accordance with one embodiment of the present invention. In other words, the beam projector assembly 700 includes both a data manipulator 610 and a passive and /or active cooling system (e.g., passive cooling system 150 and/or fans 210 and/or 310). In one embodiment, the beam projector assembly 700 includes a data manipulator 610 and the passive cooling system 150 including the fluid reservoir 120, the heat pipe 125 and thermal mass 130.

As described herein, by utilizing the passive cooling system 150, the beam projector assembly 700 may be operated without a cooling fan and the associated fan noises. In addition, since the cooling system 150 is passive, there is no need to wait for the beam projector assembly 700 to cool prior to pack up. Therefore, pack time is reduced since there is no need to keep the beam projector assembly 700 plugged in after the presentation is complete. In one embodiment, the addition of a passive cooling system 150 to the beam projector assembly 700 provides additional cooling to solve any heating issues resulting from the operation of data manipulator 610. That is, due to the increased cooling capabilities provided by passive cooling system 150, the beam projector assembly 700 can support the data manipulator 610 without detrimental heating issues damaging the components of data manipulator 610.

In another embodiment, beam projector assembly 700 includes a cooling fan 210. In one embodiment, cooling fan 210 is used to provide additional airflow to the light-generating source 115. In one embodiment, the cooling fan 210 has a thermal switch that turns on the cooling fan 210 if the temperature of the light-generating source 115 reaches a certain temperature. Therefore, the cooling fan 210 may be intermittent.

In yet another embodiment, beam projector assembly 700 includes a cooling fan 310. Cooling fan 310 is used to provide additional airflow to the thermal mass 130. In one embodiment, the cooling fan 310 has a thermal switch that turns on the cooling fan 310 if the temperature of the thermal mass 130 reaches a certain temperature. Therefore, the cooling fan 310 may be intermittent.

In another embodiment, beam projector assembly 700 includes a battery 410. Battery 410 is provided for powering the active cooling system when the beam projector assembly 400 is unplugged from a primary power source. The battery 410 may be used to power the cooling fan 210, cooling fan 310, or both cooling fan 210 and cooling fan 310. In addition, in order to maintain a charged battery 410, in one embodiment, battery 410 is recharged when the beam projector assembly 400 is plugged into a primary power source (e.g., an AC outlet). Although, there are a plurality of embodiments of beam projector assembly 700 described herein, there are a plurality of embodiments and arrangements for beam projector assembly 700 which are not described herein for purposes of clarity but are understood as variations and combinations of the assemblies and embodiments described herein.

Figure 8:
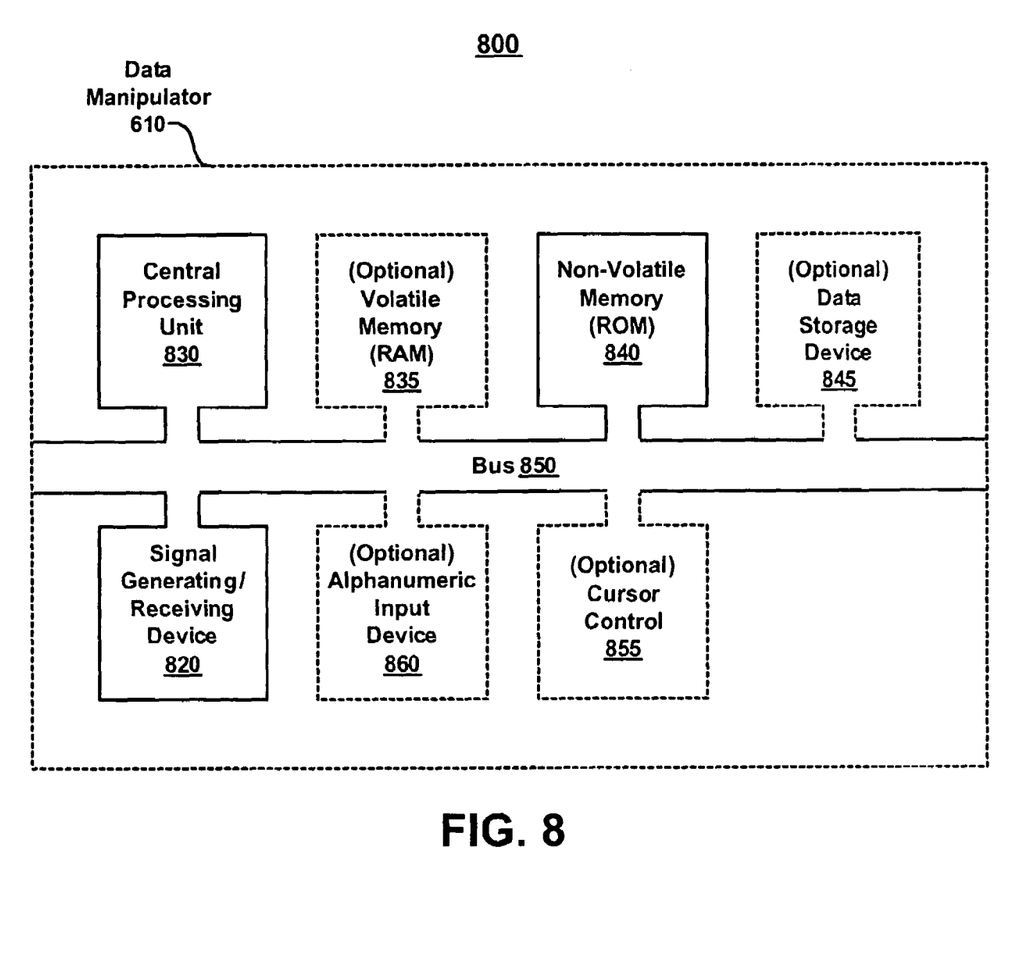
FIG. 8 is a block diagram of an embodiment of an exemplary data manipulator used in accordance with one embodiment of the present invention.

With reference now to FIG. 8, a block diagram of an embodiment of an exemplary data manipulator 610 used in accordance with the present invention is shown. Within the following discussions of the present invention, certain processes and steps are discussed that are realized, in one embodiment, as a series of instructions (e.g., software program) that reside within computer readable memory units of data manipulator 610 and executed by a processor(s) of data manipulator 610. When executed, the instructions cause data manipulator 610 to perform specific actions and exhibit specific behavior that is described in detail herein.

Data manipulator 610 of FIG. 8 comprises an address/data bus 850 for communicating information, one or more central processors 830 coupled with bus 850 for processing information and instructions. Central processor unit(s) 830 may be a microprocessor or any other type of processor. The data manipulator 610 also includes data storage features such as a computer usable non-volatile memory unit 840 (e.g., read only memory, programmable ROM, flash memory, EPROM, EEPROM, etc.) coupled with bus 850 for storing static information and instructions for processor(s) 830. Data manipulator 610 also includes one or more signal generating and receiving device(s) 820 coupled with bus 850 for enabling data manipulator 610 to interface with other electronic devices and data storage mediums (e.g., zip, flash, or the like). The signal generating and receiving device 820 of the present embodiment may include wired and/or wireless communication technology.

Optionally, data manipulator 610 may include a computer usable volatile memory unit 835 (e.g., random access memory, static RAM, dynamic RAM, etc.) coupled with bus 850 for storing information and instructions for central processor(s) 830. Data manipulator 610 can also include an alphanumeric input device 860 including alphanumeric and function keys coupled to the bus 850 for communicating information and command selections to the central processor(s) 830. The data manipulator 610 can include an optional cursor control or cursor directing device 855 coupled to the bus 850 for communicating user input information and command selections to the central processor(s) 830. The cursor-directing device 855 may be implemented using a number of well-known devices such as a mouse, a track-ball, a track-pad, an optical tracking device, a remote control, and a laser pointer, among others. Alternatively, it is appreciated that a cursor may be directed and/or activated via input from the alphanumeric input device 860 using special keys and key sequence commands. The present embodiment is also well suited to directing a cursor by other means such as, for example, voice commands.

The data manipulator 610 of FIG. 8 may also include one or more optional computer usable data storage devices 845 such as a magnetic or optical disk and disk drive (e.g., hard drive or floppy diskette) coupled with bus 850 for storing information and instructions.

Figure 9:
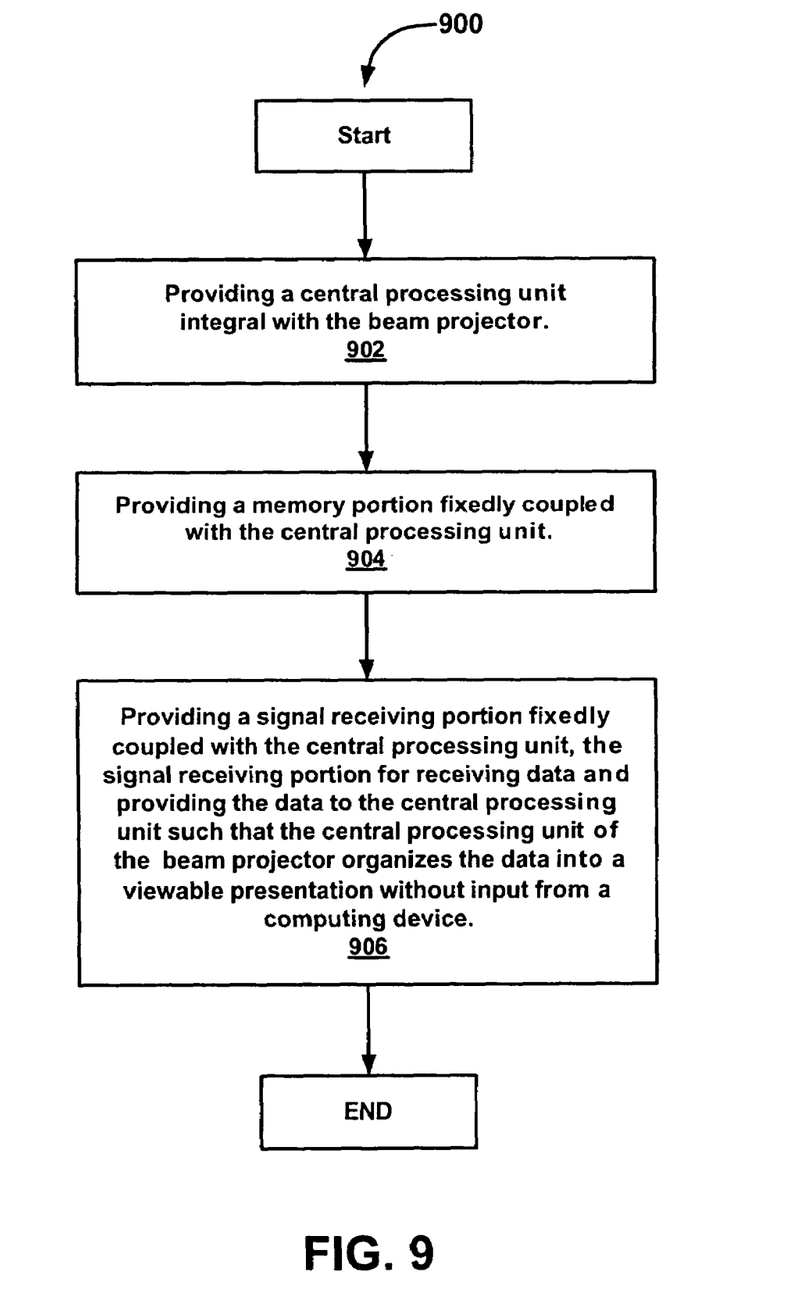
FIG. 9 is a flowchart of a method for manipulating data in a beam projector in accordance with one embodiment of the present invention.

With reference now to FIG. 9, a flowchart of a method for manipulating data in a beam projector is shown in accordance with one embodiment of the present invention.

Referring still to FIG. 9, in one embodiment step 902 provides a central processing unit integral with the beam projector. As described herein, the central processing unit 830 of FIG. 8 is used to perform the data manipulation. That is, in one embodiment, the central processing unit 830 and the operating system thereon, can initiate applications, and manipulate data to provide a viable presentation output for the beam projector.

In one embodiment, step 904 provides a memory coupled with the central processing unit. In one embodiment, the memory is non-volatile memory 840 of FIG. 8 and is used to store the static information and instructions for the central processing unit 830. In another embodiment, the memory coupled with the central processing unit 830 is computer usable volatile memory 835 (e.g., random access memory, static RAM, dynamic RAM, etc.) for storing information and instructions for central processor(s) 830. In yet another embodiment, the memory coupled with the processing unit may be both volatile memory 835 and non-volatile memory 840.

With reference still to FIG. 9, in one embodiment, step 906 provides a signal receiving portion coupled with the central processing unit, the signal receiving portion for receiving data and providing the data to the central processing unit such that the central processing unit of the beam projector organizes the data into a viewable presentation without input from a secondary computing device.

Thus, the method of flowchart 900 shows one embodiment for operating a beam projector without the beam projector being coupled with a laptop, palmtop, and/or desktop computing system. That is, the beam projector is capable of being shared during a presentation by the introduction of data directly to the beam projector by the user. For example, when utilizing the beam projector, the user introduces the data file to the beam projector. The data on the data file is then processed via an application stored within the data manipulator 610 of beam projector 600 (or 700). The result is a presentation that occurs with no secondary computer system connection to the beam projector. Therefore, sharing the beam projector is simplified since a user only needs to introduce the data to the data manipulator 610 of the beam projector 700 (or 600). In one embodiment, the data may be introduced to the data manipulator 610 as data signals received from a universal serial bus (USB) connection. In another embodiment, the data may be received by a blue tooth device, a smart media device, a PCMCIA device, a wireless 802.11a protocol, a wireless 802.11b protocol, a wireless 802.11g protocol, a wireless Ethernet connection, a wired Ethernet connection, or the like. For example, in one embodiment, the beam projector has a port for receiving data files on a stored media (e.g., Flash, or the like).

In another embodiment, the beam projector receives the data from a wireless signal generating/receiving device 820. For example, the data manipulator 610 will be a part of a wireless network. Therefore, a user will be able to upload the data to the beam projector 600 from a plurality of nodes in the network (e.g., laptops, desktops, palmtops, mobile phones, or the like). However, unlike the standard use of a beam projector wherein a computer system is linked with a network and the beam projector acts only as a monitor for the computer system, embodiments of the invention allow the beam projector 600 (or 700 of FIG. 7) to present the data on its own. Moreover, in one embodiment, since the data is introduced directly to the beam projector 600 from a data storage device (e.g., zip, flash memory, or the like), the data does not need to be stored on the data manipulator 610. Instead, the data storage device provided by the user to the beam projector 600 (or 700) acts as the memory for the data manipulator 610 and no data is stored or transferred. The data is only acted on by an application within the data manipulator 610. In so doing, a user can provide their data for presentation on beam projector 600 (or 700) without further security concern. In other words, the data will be read by the application but not stored, copied, or the like.

With reference still to FIG. 9 and now to FIG. 7, embodiments of the invention provide a passive cooling system 150 for a light-generating source 115 of the beam projector 700. In one embodiment, the passive cooling system 150 includes a fluid reservoir 120 proximal to the light-generating source 115 of the beam projector 700, the fluid reservoir 120 for storing a low energy state fluid that changes to a higher energy state fluid when it absorbs a heat energy generated by the light-generating source 115. The passive cooling system 150 also includes a heat pipe 125 coupled with the fluid reservoir 120, the heat pipe 125 transmits the higher energy state fluid. The passive cooling system 150 additionally includes a thermal mass 130 coupled with the heat pipe 125, the thermal mass 130 for receiving and dissipating the heat energy released from the higher energy state fluid when it returns to a lower energy state fluid.

In another embodiment, the beam projector assembly 700 includes an active cooling system for the light-generating source 115 of the beam. The active cooling system includes a low speed fan 310 for increasing airflow to the thermal mass 130 coupled with the heat pipe 125. In another embodiment, the active cooling system includes a fan 210 for increasing airflow across the light-generating source 115. In yet another embodiment, the active cooling system includes both the fan 210 for increasing airflow across the light-generating source 115 and the fan 310 for increasing airflow proximal the thermal mass 130. In another embodiment, the beam projector assembly 700 includes both the passive cooling system 150 and the active cooling system to provide a combined cooling system for the beam projector assembly 700. In another embodiment, Beam projector assembly 700 also includes a battery 410 for powering the active cooling system when the beam projector assembly 700 is unplugged from a primary power source.

Thus, embodiments of the present invention provide, a method and system for manipulating data in a beam projector. Additionally, embodiments provide a method and system for manipulating data in a beam projector which allows a plurality of users and/or media sources to provide data to the beam projector without an intermediate computing system. Embodiments of the present invention further provide storage limitations for data provided to the beam projector thereby reducing the security risks associated with a shared format of data presentation.

While the method of the embodiment illustrated in flow charts 500 and 900 show specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

The alternative embodiment(s) of the present invention, a method and system for beam projector having data manipulation capabilities, is thus described. While the present invention has been described in particular embodiments, it should be appreciated that the present invention should not be construed as limited by such embodiments, but rather construed according to the below claims.

What is claimed is:

1. A beam projector having data manipulation capabilities comprising:

a central processing unit integral with said beam projector;

a memory portion coupled with said central processing unit; and a signal receiving portion coupled with said central processing unit, said signal receiving portion for receiving data from said memory portion and providing said data to said central processing unit without storing the data by a component of said beam projector such that said central processing unit of said beam projector organizes said data into a viewable presentation without requiring input from a secondary computing device.

2. The beam projector of claim 1 wherein said signal receiving portion receives signals from the group of devices consisting of:

a universal serial bus (USB) device, a blue tooth device, a smart media device, a PCMCIA device, a wireless 802.11a protocol compliant device, a wireless 802.11b protocol compliant device, a wireless 802.11g protocol compliant device, a wireless Ethernet connection, and a wired Ethernet connection.

3. The beam projector of claim 1 further comprising:
a beam projector cooling assembly comprising:
a fluid reservoir proximal to a light-generating source of said beam projector, said fluid reservoir for storing a low energy state fluid that changes to a higher energy state fluid when it absorbs a heat energy generated by said light-generating source;
a heat pipe coupled with said fluid reservoir, said heat pipe for transmitting the higher energy state fluid; and
a thermal mass coupled with said heat pipe, said thermal mass for receiving and dissipating the heat energy released from the higher energy state fluid when it returns to a lower energy state fluid.

4. The beam projector of claim 3 further comprising:
a light-generating source fan for providing increased airflow proximate said light-generating source; and
a thermal mass fan for providing increased airflow proximate said thermal mass coupled with said heat source.

5. The beam projector of claim 4 further comprising:
a battery for powering said light-generating source fan and said thermal mass fan when said beam projector is not connected with a primary power source.

6. A method for manipulating data in a beam projector comprising:
providing a central processing unit integral with the beam projector;
providing a memory portion coupled with said central processing unit; and
providing a signal receiving portion coupled with said central processing unit, said signal receiving portion for receiving data from said memory portion and providing said data to said central processing unit without storing the data by a component of said beam projector such that said central processing unit of said beam projector organizes said data into a viewable presentation without requiring input from a secondary computing device.

7. The method as recited in claim 6 further comprising:
cooling a beam projector comprising:
providing a passive cooling system for a light-generating source of said beam projector.

8. The method as recited in claim 7 wherein said providing said passive cooling system further comprises:
providing a fluid reservoir proximal to a light-generating source of said beam projector, said fluid reservoir for storing a low energy state fluid that changes to a higher energy state fluid when it absorbs a heat energy generated by said light-generating source;

providing a heat pipe coupled with said fluid reservoir, said heat pipe for transmitting the higher energy state fluid; and providing a thermal mass coupled with said heat pipe, said thermal mass for receiving and dissipating the heat energy released from the higher energy state fluid when it returns to a lower energy state fluid.

9. The method as recited in claim 6 further comprising:
cooling a beam projector comprising:
providing an active cooling system for said light-generating source of said beam, wherein said passive cooling system and said active cooling system provide a combined cooling system for said light-generating source of said beam projector.

10. The method as recited in claim 9 wherein said providing said active cooling system further comprises:
providing a low speed fan for increasing airflow to said thermal mass coupled with said heat pipe.

11. The method as recited in claim 9 wherein said providing said active cooling system further comprises:
providing a fan for increasing airflow across said light-generating source.

12. The method as recited in claim 9 further comprising:
providing a battery for powering said active cooling system when said beam projector is unplugged from a primary power source.

13. The method as recited in claim 6 wherein said signal-receiving portion further comprises:
receiving signals from the group of signal compliant device consisting of:
a universal serial bus (USB) device, a blue tooth device, a smart media device, a PCMCIA device, a wireless 802.11a protocol compliant device, a wireless 802.11b protocol compliant device, a wireless 802.11g protocol compliant device, a wireless Ethernet connection, and a wired Ethernet connection.

14. A method for manipulating data in a beam projector comprising:
providing a central processing unit integral with a beam projector;
providing a memory portion coupled with said central processing unit;
providing a signal receiving portion coupled with said central processing unit, said signal receiving portion for receiving data from said memory portion and providing said data to said central processing unit without storing the data by a component of said beam projector such that said central processing unit of said beam projector organizes said data into a viewable presentation without requiring input from a secondary computing device; and
providing a passive cooling system for a light-generating source of said beam projector.

15. The method as recited in claim 14 wherein said providing said passive cooling system further comprises:
providing a fluid reservoir proximal to a light-generating source of said beam projector, said fluid reservoir for storing a low energy state fluid that changes to a higher energy state fluid when it absorbs a heat energy generated by said light-generating source;
providing a heat pipe coupled with said fluid reservoir, said heat pipe for transmitting the higher energy state fluid; and
providing a thermal mass coupled with said heat pipe, said thermal mass for receiving and dissipating the heat energy released from the higher energy state fluid when it returns to a lower energy state fluid.

16. The method as recited in claim 15 further comprising:
providing an active cooling system for said light-generating source of said beam projector, wherein said passive cooling system and said active cooling system provide a combined cooling system for said light-generating source of said beam projector.

17. The method as recited in claim 16 further comprising:
providing a battery for said beam projector, said battery for providing power to said active cooling system when said beam projector is disconnected from a primary power source.

18. The method as recited in claim 14 wherein said signal-receiving portion further comprises:
receiving signals from the group of signal devices consisting of:
a universal serial bus (USB) device, a blue tooth device, a smart media device, a PCMCIA device, a wireless 802.11a protocol compliant device, a wireless 802.11b protocol compliant device, a wireless 802.11g protocol compliant device, a wireless Ethernet connection, and a wired Ethernet connection.

* * * * *